US008385745B2

(12) United States Patent
Zhao

(10) Patent No.: US 8,385,745 B2
(45) Date of Patent: Feb. 26, 2013

(54) METHOD AND APPARATUS FOR TRANSMITTING/RECEIVING SIGNALS IN A MICROWAVE SYSTEM

(75) Inventor: Guixue Zhao, Guangdong (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 252 days.

(21) Appl. No.: 12/625,878

(22) Filed: Nov. 25, 2009

(65) Prior Publication Data

US 2010/0150565 A1 Jun. 17, 2010

(30) Foreign Application Priority Data

Dec. 17, 2008 (CN) .......................... 2008 1 0186118

(51) Int. Cl.
*H04B 10/00* (2006.01)

(52) U.S. Cl. ............ 398/115; 398/135; 398/139; 398/2; 398/5

(58) Field of Classification Search .................. 398/115, 398/135, 138, 139, 5, 2, 1
See application file for complete search history.

(56) References Cited

U.S. PATENT DOCUMENTS 5,091,904 A * 2/1992 Back et al. .................... 370/220
6,028,850 A * 2/2000 Kang ............................ 370/320
6,072,994 A * 6/2000 Phillips et al. .................. 455/84
6,771,908 B2 * 8/2004 Eijk et al. ......................... 398/66
6,792,053 B1 * 9/2004 Vainio et al. .................. 375/341
7,047,028 B2 * 5/2006 Cagenius ...................... 455/502
7,103,279 B1 * 9/2006 Koh et al. ..................... 398/115
7,570,111 B1 * 8/2009 Vagher et al. ................. 330/126

(Continued)

FOREIGN PATENT DOCUMENTS

CN 1575556 A 2/2005
CN 1684381 A 10/2005

(Continued)

OTHER PUBLICATIONS

2nd Office Action in corresponding Chinese Application No. 200810186118.2 (Jan. 30, 2011).

(Continued)

*Primary Examiner* — Daniel Washburn
*Assistant Examiner* — Hibret Woldekidan
(74) *Attorney, Agent, or Firm* — Leydig, Voit & Mayer, Ltd.

(57) ABSTRACT

This invention discloses a method and an apparatus for transmitting/receiving signals in a microwave system, and pertains to the field of communications. The transmitting method comprises receiving and modulating a transmission signal transmitted via an optical fiber; processing the modulated transmission signal to generate RF signal; and separating the RF signal to be transmitted from a signal received via an antenna, and transmitting the separated RF signal via the antenna. The receiving method comprises separating a signal received via an antenna from a signal to be transmitted; processing the received signal after being separated to generate IF signal; demodulating the generated IF signal; and transmitting the received signal after being demodulated via an optical fiber. The transmitting/receiving apparatus comprises an optical fiber signal interface, a signal reception module, a modulation module, an IF-RF transmission module, a duplexer, a control module and a power interface. Use of the optical fiber to transmit the transmission signal and the received signal according to the present invention makes it possible for application of large capacity microwave and also greatly saves production cost.

5 Claims, 7 Drawing Sheets

U.S. PATENT DOCUMENTS 7,613,391 B2 * 11/2009 Tajima .............................. 398/5
7,751,715 B2 * 7/2010 Takami et al. ................ 398/115
7,796,502 B2 * 9/2010 Li ................................ 370/222
7,936,714 B1 * 5/2011 Karr et al. ..................... 370/329
8,032,032 B2 * 10/2011 Chand et al. .................. 398/140
2001/0046844 A1 * 11/2001 Oura ............................ 455/133
2003/0067869 A1 * 4/2003 Harris et al. .................. 370/217
2004/0108940 A1 * 6/2004 Witkow et al. ........... 340/825.25
2004/0156579 A1 * 8/2004 Jasti ................................ 385/16
2004/0180650 A1 9/2004 Kamemura et al.
2004/0192233 A1 * 9/2004 Mitzlaff ..................... 455/127.1
2004/0214603 A1 * 10/2004 Tanabe et al. ................. 455/561
2005/0288060 A1 12/2005 Kojima
2006/0127086 A1 * 6/2006 Frankel ........................... 398/19
2006/0153567 A1 * 7/2006 Kim et al. ....................... 398/72
2006/0217158 A1 9/2006 Uwano et al.
2007/0160012 A1 7/2007 Liu
2007/0195693 A1 8/2007 Li
2007/0201869 A1 * 8/2007 Weston-Dawkes et al. .... 398/45
2009/0109836 A1 * 4/2009 Wasden et al. ................ 370/216
2010/0209113 A1 * 8/2010 Nagaki et al. ................. 398/140
2011/0116790 A1 * 5/2011 Sakauchi et al. .................. 398/5

FOREIGN PATENT DOCUMENTS

WO WO 2007/038969 A1 4/2007

OTHER PUBLICATIONS

European Patent Office, Extended European Search Report in European Application No. 09176823.4 (Feb. 2, 2010).

* cited by examiner

METHOD AND APPARATUS FOR TRANSMITTING/RECEIVING SIGNALS IN A MICROWAVE SYSTEM

CROSS-REFERENCE TO RELATED APPLICATION

This application claims priority to Chinese Patent Application No. 200810186118.2, filed on Dec. 17, 2008, which is hereby incorporated by reference in its entirety.

FIELD OF THE INVENTION

The present invention relates to the field of communications, and more particularly to a method and an apparatus for transmitting/receiving signals in a microwave system.

BACKGROUND OF THE INVENTION

The most conventional system design in a microwave system includes an indoor unit and an outdoor unit mounted separately from each other and connected via an intermediate frequency (IF) cable to each other. Signals transmitted over the cable include a transmission/reception IF signal, a transmission/reception control signal and a 48 V power signal. Refer to FIG. 1, which shows the operational principle of the prior art. As shown in FIG. 1, in the transmission direction, after the transmission data is modulated by a modulation/demodulation unit 10 in the indoor unit 1, the data is transmitted to a first IF transmission unit 11 to be mixed, filtered and amplified, is then sent via an IF cable to a combining/branching unit 13 of the outdoor unit 2 for branching after having been combined by a combining/branching unit 12 in the indoor unit 1, is subsequently processed by a second IF transmission unit 14 for cable compensation, filtering, amplification, mixing and filtering process, undergoes mixing, filtering and amplification by a microwave transmission unit 15, and is finally transmitted to an antenna via a duplexer 16. In the reception direction, the signal received by the antenna is amplified, mixed and filtered by a microwave reception unit 17 of the outdoor unit 2, is then sent to a second IF reception unit 18 for amplification, mixing, filtering and amplification, and is subsequently sent via the combining/branching unit 13 to the indoor unit 1, which separates the received signal via the combining/branching unit 12; the separated signal undergoes automatic gain control, filtering and sampling by a first IF reception unit 19, and is finally sent to the modulation/demodulation unit 10 to be demodulated into a traffic data signal.

The signal bandwidth of the IF transmission/reception signal is markedly increased in application to large capacity microwave, and in practical application the transmission signal occupies even more signal bandwidth during predistortion. Moreover, in order to ensure IF transmission/reception interval, the transmission/reception frequency may have to be markedly increased, while increase of the frequency means more attenuation of the cable, so that the prior art separate design of the indoor unit and the outdoor unit in application to such large capacity microwave not only increases the difficulty in design, but also inevitably requires less attenuation of the IF cable due to more attenuation of the signal caused by increase in the IF. Consequently, stricter requirement is called for the cable, and the production cost of the cable is hence increased.

SUMMARY OF THE INVENTION

Embodiments of the present invention provide a method and an apparatus for transmitting/receiving signals in a microwave system, whereby it is made possible to achieve application in large capacity microwave and to save production cost. The technical solutions according to the present invention are as follows.

A method for transmitting a signal in a microwave system comprises:

receiving and modulating a transmission signal transferred via an optical fiber;

processing the modulated transmission signal to generate RF signal; and separating the RF signal to be transmitted from a signal received via an antenna, and transmitting the separated RF signal via the antenna.

A method for receiving a signal in a microwave system comprises:

separating a signal received via an antenna from a signal to be transmitted;

processing the received signal after being separated to generate IF signal;

demodulating the generated IF signal; and transmitting the received signal after being demodulated via an optical fiber.

An apparatus for transmitting/receiving a signal in a microwave system is adapted to comprise an optical fiber signal interface, a signal reception module, a modulation module, an IF-RF transmission module, a duplexer, a control module and a power interface, wherein the signal reception module is adapted to receive a transmission signal sent from another apparatus via the optical fiber signal interface, and send the transmission signal to the modulation module;

the modulation module is adapted to modulate the transmission signal sent from the signal reception module;

the IF-RF transmission module is adapted to process the transmission signal having been modulated by the modulation module to generate RF signal;

the duplexer is adapted to separate the RF signal to be transmitted from a signal received via an antenna, and transmit the separated signal to the antenna;

the control module is adapted to configure and manage the signal reception module, the modulation module and the IF-RF transmission module in the apparatus via the optical fiber signal interface; and the power interface is adapted to enable another apparatus to supply power to the apparatus.

Advantageous effects of the technical solutions according to the embodiments of the present invention are presented below. In comparison with the separated design of the indoor unit and the outdoor unit in the prior art microwave technology, the integrated design of the microwave system greatly simplifies the complexity of the IF-RF transmitting/receiving processes in the separated design of the indoor unit and the outdoor unit, reduces 1~2 frequency mixing stages, simplifies the designs of the transmission and separation filter and the amplifier, hence reduces the cost of IF-RF design, decreases the loss of signal-to-noise ratio brought about by signal combining and branching in the separated design of the indoor unit and the outdoor unit, increases the reception sensitivity of the system by about 1 dB, achieves the objectives of lowering system consumption at the same time of lowering circuit complexity, realizes application of large capacity microwave due to the use of optical fibers for transmitting and receiving signals, and greatly saves production cost.

DETAILED DESCRIPTION OF THE INVENTION

To make more apparent the objectives, technical solutions and advantages of the present invention, the embodiments of the present invention are described in greater detail below with reference to the accompanying drawings.

Embodiment 1

Figure 1:
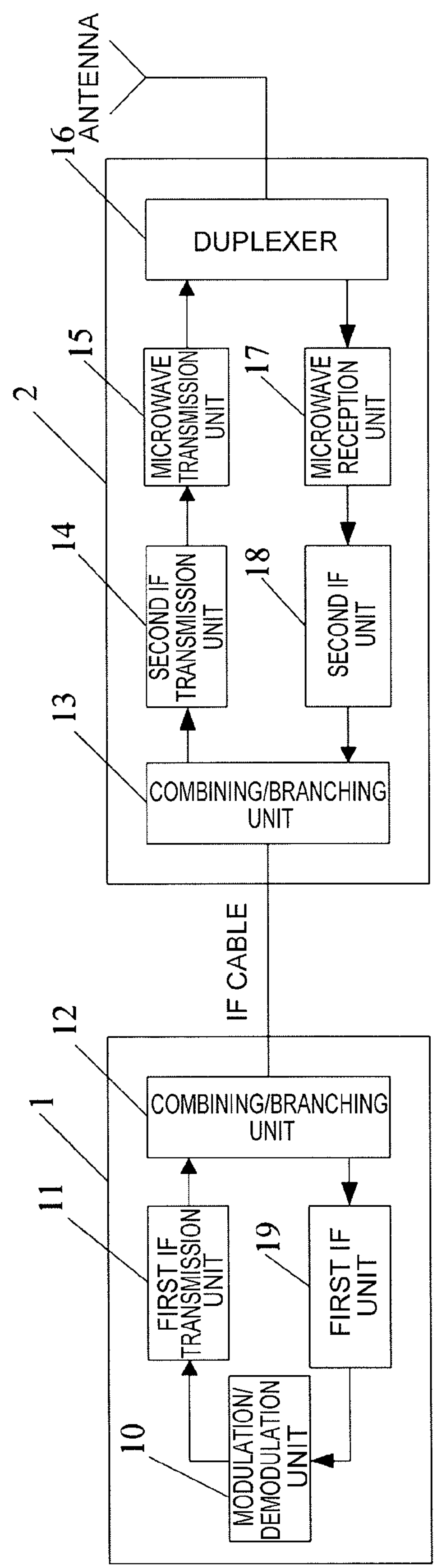
FIG. 1 is a view exemplarily showing transmission/reception of a signal in the prior art microwave system.
Figure 2:
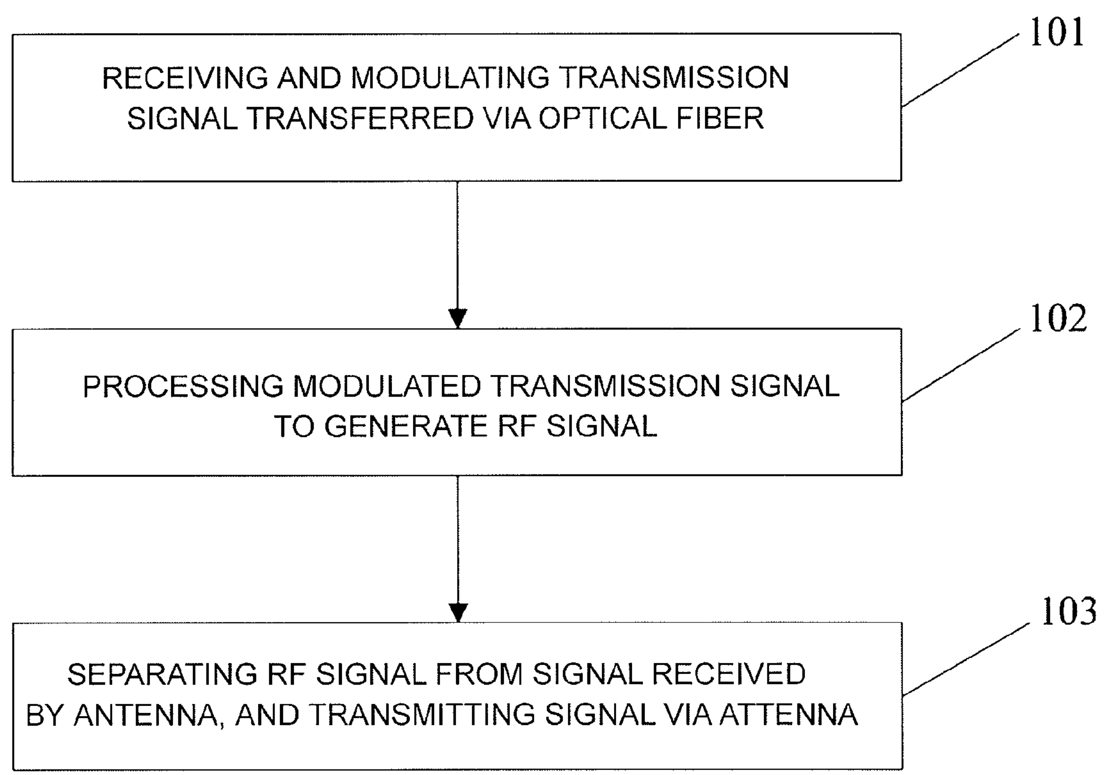
FIG. 2 is a flowchart exemplarily showing a method for transmitting a signal in the microwave system according to Embodiment 1 of the present invention.

Referring to FIG. 2, the embodiment of the present invention provides a method for transmitting a signal in a microwave system, which method comprises the following steps:

Step 101: receiving and modulating a transmission signal transferred via an optical fiber.

Specifically, the transmission signal transferred via the optical fiber includes a traffic signal and a control signal. The traffic signal is extracted and then modulated.

Step 102: processing the modulated transmission signal to generate RF signal.

In such processing, the signal firstly undergoes IF transmission processing including digital-to-analog conversion, analog IQ modulation, filtering and amplification, and then undergoes microwave RF processing including up-conversion, filtering and amplification.

Step 103: separating the RF signal to be transmitted from a signal received via an antenna, and transmitting the separated RF signal via the antenna.

Specifically, a duplexer is used to separate the RF signal to be transmitted from the received signal via the antenna. The function of the duplexer is to separate the RF signal to be transmitted from the received signal to guarantee that transmission and reception normally operate at the same time. The duplexer consists of two sets of bandpass filters having different frequencies to prevent the native transmission signal from being transmitted to the receiver.

The step of receiving and modulating a transmission signal transferred via an optical fiber includes: receiving the transmission signal transferred via the optical fiber, dividing the received transmission signal into two branches, taking one branch of the received transmission signal as a backup signal, selecting any one from the another branch of the received transmission signal and a transmission signal sent from a traffic protection bus to modulate.

Backing up one branch of the received transmission signal may protect the received transmission signal, and prevent transmission of the signal from being affected when malfunction occurs over the transmission path. This is because when there is a failure over the transmission path, the backup transmission signal may be transmitted over another transmission path; while, when the transmission path is normal, the backup transmission signal remains silent.

When the transmission signal is protected, the received transmission signal is identical with the transmission signal sent from the traffic protection bus.

After reception of the transmission signal transferred via the optical fiber, the method further comprises transmitting the received transmission signal to a device via the optical fiber, to thus form relay networking.

Advantageous effects of this embodiment are in that use of the optical fiber to transmit the transmission signal makes it possible for application of the large capacity microwave, whereas in the prior art, the use of the IF cable to transmit the transmission signal inevitably requires less attenuation of the IF cable due to more attenuation of the signal caused by increase in the IF in the case of a long cable, so that stricter requirement is called for the cable, the production cost of the cable is correspondingly increased, and the overall production cost is greatly increased. By comparison, the use of the optical fiber to transmit the transmission signal according to this embodiment of the present invention greatly reduces the production cost, and backing up the transmission signal provides reliable protection for transmission of the signal.

Embodiment 2

Figure 3:
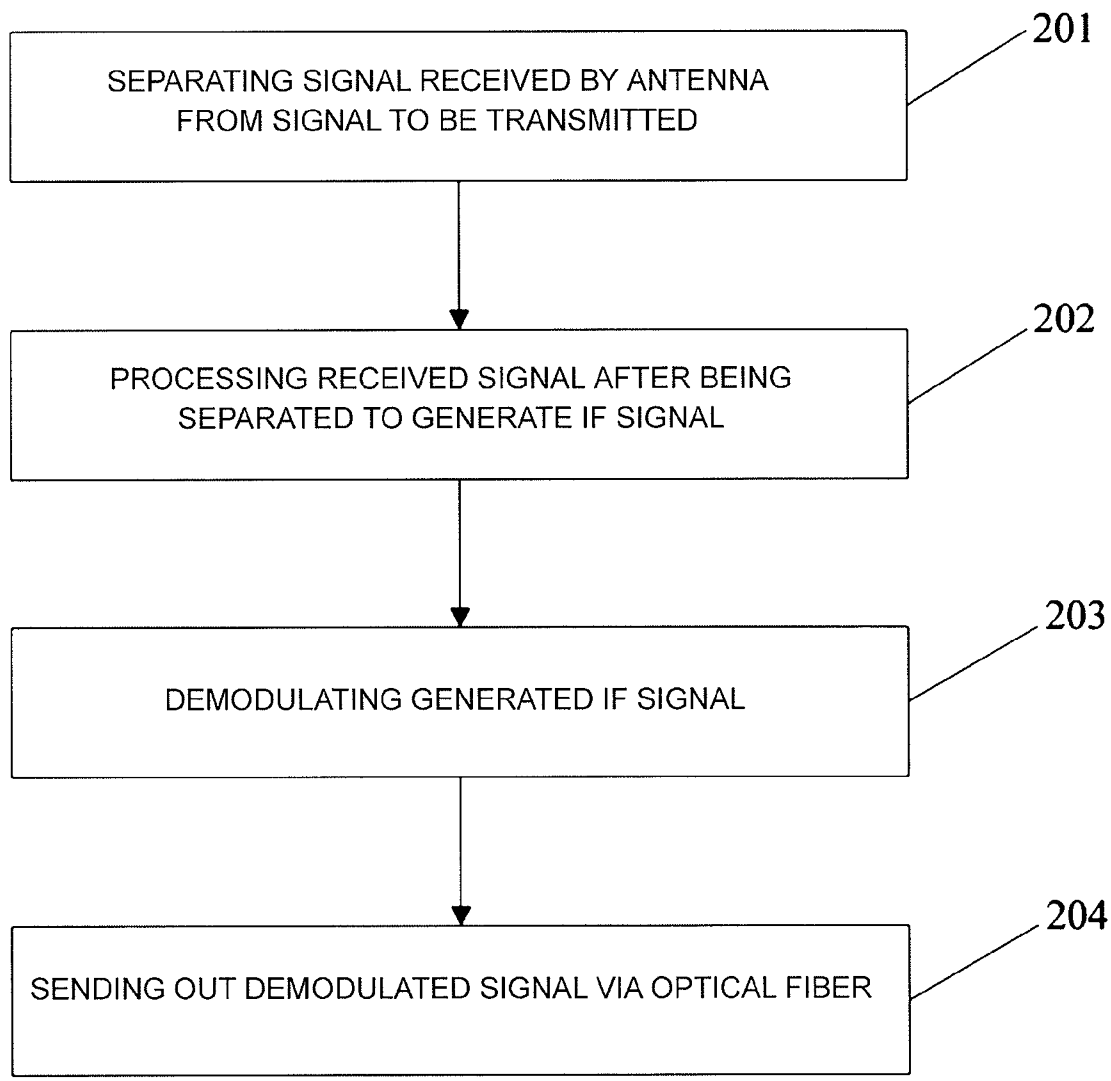
FIG. 3 is a flowchart exemplarily showing a method for receiving a signal in the microwave system according to Embodiment 2 of the present invention.

Referring to FIG. 3, the embodiment of the present invention provides a method for receiving a signal in a microwave system, which method comprises:

Step 201: separating a signal received via an antenna from a signal to be transmitted.

Specifically, a duplexer may be used to separate the signal received via the antenna from the signal to be transmitted. The function of the duplexer is to separate the received signal from the signal to be transmitted to guarantee that reception and transmission normally operate at the same time. The duplexer consists of two sets of bandpass filters having different frequencies to prevent the native received signal from being transmitted to the transmitter.

Step 202: processing the received signal after being separated to generate IF signal.

In such processing, the signal firstly undergoes microwave RF reception processing including down-conversion, amplification and filtering, and then undergoes IF reception processing including down-conversion, automatic gain control, filtering and analog-to-digital conversion.

Step 203: demodulating the generated IF signal.

Step 204: transmitting the demodulated received signal via an optical fiber.

The step of transmitting the demodulated received signal via an optical fiber includes: dividing the demodulated received signal into two branches, taking one branch of the received signal as a backup, selecting any one from the another branch of the received signal and a demodulated received signal sent from a traffic protection bus to process, and transmitting the received signal after being processed via the optical fiber.

Processing of the received signal that is randomly selected pertains to the prior art, and the description thereof is omitted.

When the received signal is protected, the demodulated received signal is identical with the demodulated received signal sent from the traffic protection bus.

Backing up one branch of the received signal may protect the received signal, and prevent reception of the signal from being affected when malfunction occurs over the reception path. This is because when there is a failure over the reception path, the backup received signal may be received over another reception path.

Advantageous effects of this embodiment are in that use of the optical fiber to transmit the received signal makes it possible for application of the large capacity microwave, whereas in the prior art, the use of the IF cable to receive the received signal inevitably requires less attenuation of the IF cable due to more attenuation of the signal caused by increase in the IF in the case of a long cable, so that stricter requirement is called for the cable, the production cost of the cable is correspondingly increased, and the overall production cost is greatly increased. By comparison, the use of the optical fiber to transmit the received signal according to this embodiment of the present invention greatly reduces the production cost, and backing up the received signal provides reliable protection for reception of the signal.

Embodiment 3

Figure 4:
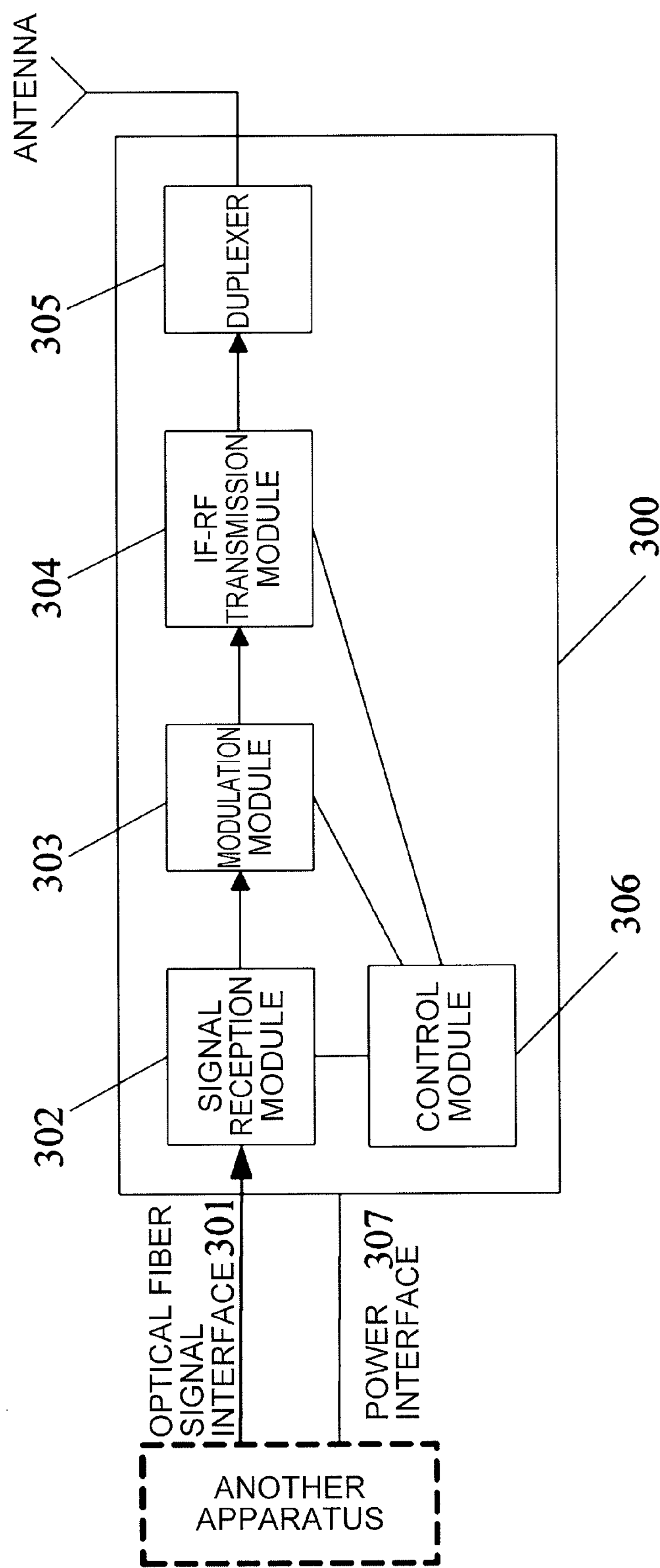
FIG. 4 is a view exemplarily showing the structure of an apparatus for transmitting a signal in the microwave system according to Embodiment 3 of the present invention.

Referring to FIG. 4, the embodiment of the present invention provides an apparatus 300 for transmitting a signal in a microwave system. The apparatus 300 is adapted to comprise an optical fiber signal interface 301, a signal reception module 302, a modulation module 303, an IF-RF transmission module 304, a duplexer 305, a control module 306 and a power interface 307.

The signal reception module 302 is adapted to receive a transmission signal sent from another apparatus via the optical fiber signal interface 301, and send the received transmission signal to the modulation module 303.

Specifically, the transmission signal transferred via the optical fiber includes a traffic signal and a control signal. The signal reception module 302 is adapted to perform extraction on the transmission signal, and transmit the extracted traffic signal to the modulation module 303.

The modulation module 303 is adapted to modulate the transmission signal sent from the signal reception module 302.

The IF-RF transmission module 304 is adapted to process the transmission signal having been modulated by the modulation module 303 to generate RF signal.

An IF transmission processing is firstly performed, which includes digital-to-analog conversion, analog IQ modulation, filtering and amplification, and a microwave RF transmission processing is subsequently performed, which includes up-conversion, filtering and amplification.

The duplexer 305 is adapted to separate the RF signal generated by the IF-RF transmission module 304 from a signal received via an antenna, and transmit the RF signal to the antenna.

The function of the duplexer 305 is to separate the RF signal to be transmitted from the signal received from the antenna to guarantee that transmission and reception normally operate at the same time. The duplexer 305 consists of two sets of bandpass filters having different frequencies to prevent the native transmitted signal from being transmitted to the receiver.

The control module 306 is adapted to configure and manage the signal reception module 302, the modulation module 303 and the IF-RF transmission module 304 in the apparatus 300 via the optical fiber signal interface 301.

The power interface 307 is adapted to enable another apparatus to supply power to the apparatus 300.

The apparatus 300 is further adapted to comprise a backup control interface configured in the control module 306. The control module 306 is further adapted to configure and manage the signal reception module 302, the modulation module 303 and the IF-RF transmission module 304 in the apparatus 300 via the backup control interface.

Figure 5:
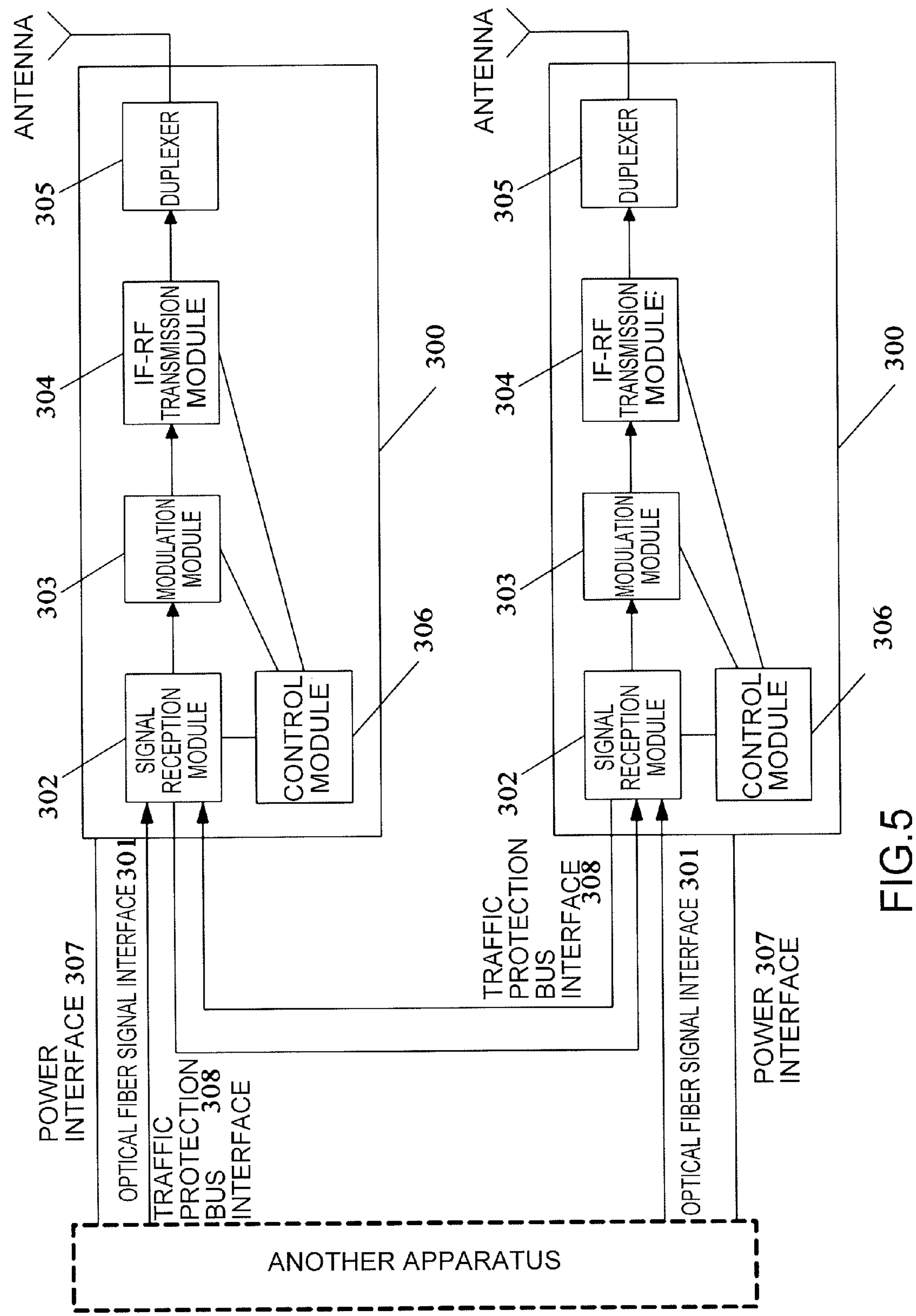
FIG. 5 is a view exemplarily showing the structure of another apparatus for transmitting a signal in the microwave system according to Embodiment 3 of the present invention.

Referring to FIG. 5, the apparatus 300 is further adapted to comprise a traffic protection bus interface 308. The signal reception module 302 is adapted to receive the transmission signal via the optical fiber signal interface 301, divide the transmission signal into two branches, take one branch of the transmission signal as a backup signal, and select any one of the another branch of the transmission signal and a transmission signal sent from the traffic protection bus interface 308 for transmission to the modulation module 303 via the optical fiber signal interface 301.

In case that the transmission signal is protected, the two apparatuses are identical, and the transmission signals received thereby are also identical.

Under such situation the transmission signal may be protected. The apparatus 300 serves as a primary transmission apparatus, and the another apparatus serves as an auxiliary transmission apparatus. Both of the primary transmission apparatus and the auxiliary transmission apparatus are used to transmit transmission signals transferred via the optical fiber, and the primary transmission apparatus divides the received transmission signal into two branches, whereby any one of one branch of the transmission signal and a signal received by the auxiliary transmission apparatus is selected to be sent to the modulation module 303 for modulation there. It is thus possible to prevent transmission of the signal from being affected in the case that the primary transmission apparatus malfunctions. Meanwhile, another branch of the transmission signal of the primary transmission apparatus is transmitted to the auxiliary transmission apparatus, and this also prevents transmission of the signal from being affected in the case that the primary transmission apparatus malfunctions, because when there is a failure in the primary transmission apparatus, the transmission signal may be transmitted by the auxiliary transmission apparatus, while when the primary transmission apparatus normally operates, the auxiliary transmission apparatus remains silent.

The apparatus 300 may also be connected to another apparatus via the optical fiber signal interface 301 to form relay networking, and the other apparatus is identical with the apparatus 300.

The duplexer 305 in the apparatus is also adapted to separate the signal received from the antenna from the signal to be transmitted.

The duplexer 305 is adapted to separate the signal received by the antenna from the signal to be transmitted to guarantee that reception and transmission normally operate at the same time. The duplexer 305 consists of two sets of bandpass filters having different frequencies to prevent the native received signal from being transmitted to the transmitter.

Embodiment 4

Figure 6:
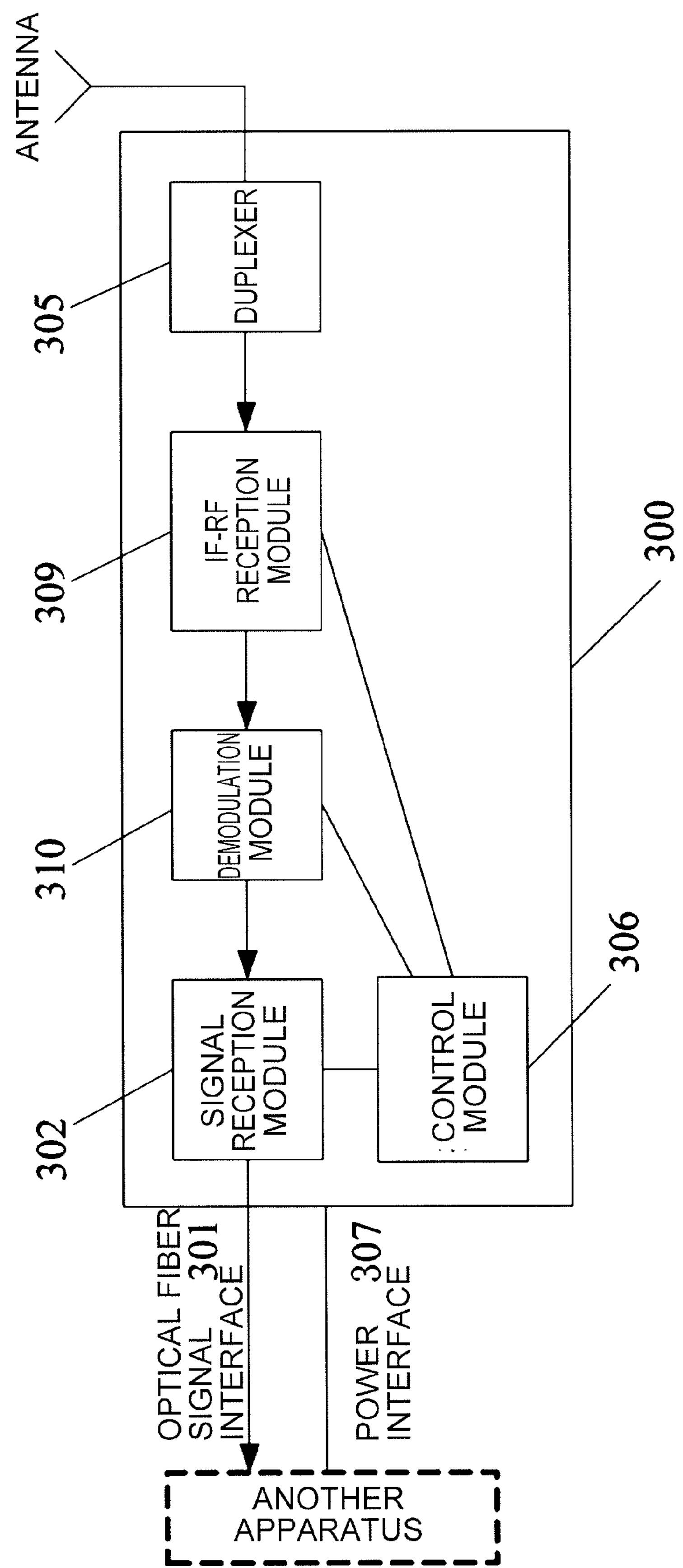
FIG. 6 is a view exemplarily showing the structure of an apparatus for receiving a signal in the microwave system according to Embodiment 4 of the present invention.

Correspondingly, referring to FIG. 6, the apparatus is further adapted to comprise an IF-RF reception module 309 and a demodulation module 310.

The IF-RF reception module 309 is adapted to process the received signal after being separated via the duplexer 305 to generate IF signal.

A microwave RF reception processing is firstly performed, which includes down-conversion, amplification and filtering, and an IF reception processing is subsequently performed, which includes down-conversion, automatic gain control, filtering and analog-to-digital conversion.

The demodulation module 310 is adapted to demodulate the IF signal generated by the IF-RF reception module 309.

The signal reception module 302 is further adapted to transmit the received signal demodulated by the demodulation module 310 to another apparatus via the optical fiber signal interface 301.

The control module 306 is further adapted to configure and manage the IF-RF reception module 309 and the demodulation module 310 in the apparatus 300 via the optical fiber signal interface 301.

The control module 306 of the apparatus 300 is further adapted to configure and manage the IF-RF reception module 309 and the demodulation module 310 via the backup control interface.

Figure 7:
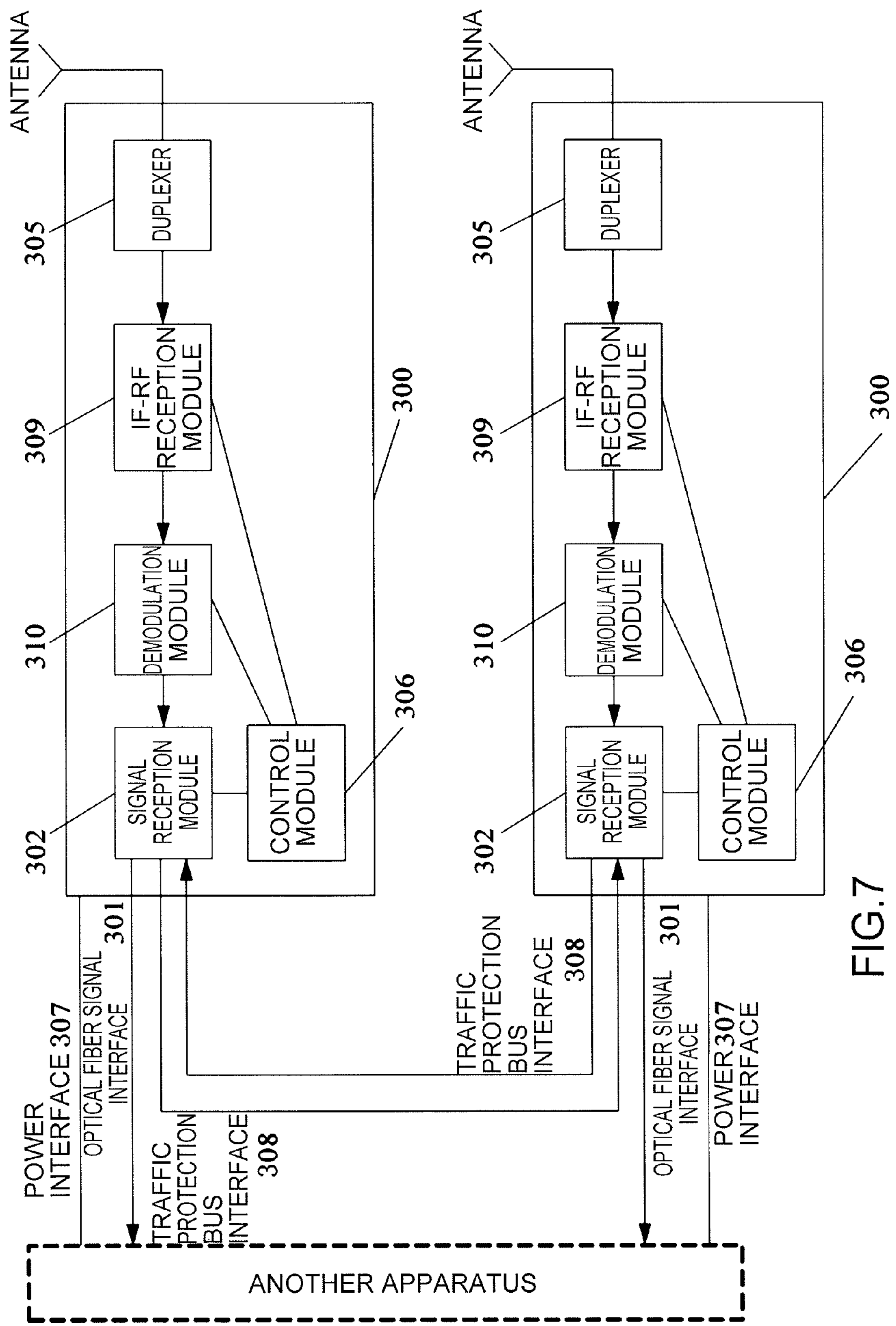
FIG. 7 is a view exemplarily showing the structure of another apparatus for receiving a signal in the microwave system according to Embodiment 4 of the present invention.

Referring to FIG. 7, the signal reception module 302 of the apparatus 300 is alternatively adapted to divide the demodulated received signal sent from the demodulation module 310 into two branches, send one branch of the received signal to another apparatus via the traffic protection bus interface 308, select any one of the another branch of the received signal and a demodulated received signal sent from another apparatus via the traffic protection bus interface 308 to process, and transmit the received signal after being processed to another apparatus via the optical fiber signal interface 301.

Processing of the received signal that is randomly selected pertains to the prior art, and the description thereof is omitted herein.

In case that the received signal is protected, the two apparatuses are identical, and the signals received thereby are also identical.

Under such situation the received signal may be protected. The apparatus 300 serves as a primary reception apparatus, and another apparatus serves as an auxiliary reception apparatus. Both of the primary reception apparatus and the auxiliary reception apparatus are used to receive signals, and the primary reception apparatus divides the received signal demodulated by the demodulation module 310 into two branches, whereby any one of one branch of the received signal and a signal received by the auxiliary reception apparatus is selected to be transmitted via the optical fiber signal interface 301. It is thus possible to prevent reception of the signal from being affected in the case the primary reception apparatus malfunctions. Meanwhile, another branch of the demodulated received signal of the primary reception apparatus is transmitted to the auxiliary reception apparatus, and this also prevents reception of the signal from being affected in the case the primary reception apparatus malfunctions, because when there is a failure in the primary reception apparatus, the received signal may be received by the auxiliary reception apparatus, while when the primary reception apparatus normally operates, the auxiliary reception apparatus may remain silent.

The apparatus may be located outdoors in such places as a telecommunication tower to directly transmit/receive signals.

Advantageous effects of the receiving apparatus according to the embodiment of the present invention are presented below. In comparison with the separated design of the indoor unit and the outdoor unit in the prior art microwave technology, the integrated design of the microwave system according to the present invention greatly simplifies the complexity of the IF-RF transmitting/receiving processes in the separated design of the indoor unit and the outdoor unit, decreases the use of the reception cable attenuation automatic compensation amplification circuit, reduces 1~2 frequency mixing stages, simplifies the designs of the transmission and separation filter and the amplifier, hence reduces the cost of IF-RF design, decreases the loss of signal-to-noise ratio brought about by signal combining and branching in the separated design of the indoor unit and the outdoor unit, increases the reception sensitivity of the system by about 1 dB, and achieves the objectives of lowering system consumption at the same time of lowering circuit complexity. Moreover, by employing a single optical fiber signal interface, the apparatus may be connected to any other apparatuses via the optical fiber signal interface, thus greatly reducing the types of the transmitting/receiving apparatuses of the microwave system. Furthermore, the use of the optical fiber to transmit the transmission signal makes it possible for application of the large capacity microwave, whereas in the prior art, the use of the IF cable to transmit the received signal inevitably requires less attenuation of the IF cable due to more attenuation of the signal caused by increase in the IF in the case of a long cable, so that stricter requirement is called for the cable, the production cost of the cable is correspondingly increased, and the overall production cost is greatly increased. By comparison, the use of the optical fiber to transmit the received signal according to this embodiment of the present invention greatly reduces the production cost, and backing up the transmitting/receiving apparatus provides reliable protection for transmission/reception of the signal.

Embodiments of the present invention may be realized in the mode of combining software with hardware, and the corresponding software program may be stored in a readable storage medium, such as a computer hard disk, a buffer or an optical disc.

The above are merely preferred embodiments of the present invention, and are not intended to restrict the present invention. Any modification, equivalent substitution and improvement made without departing from the concept and spirit of the present invention shall be covered within the protection scope of the present invention.

What is claimed is:

1. A method for transmitting/receiving a signal in a microwave system, when a signal is transmitted and there is a failure in a primary transmission apparatus in the microwave system, the method comprising:

receiving a first transmission signal transferred via an optical fiber;

dividing the first transmission signal into a first branch and a second branch;

taking the first branch of the transmission signal as a backup signal;

selecting for modulation, a second transmission signal from the group consisting of: (a) the second branch of the first transmission signal, and (b) a third transmission signal sent from a traffic protection bus;

modulating the selected second transmission signal;

processing the modulated second transmission signal to generate an RF signal; and separating the RF signal to be transmitted from a first signal received via an antenna, and transmitting the separated RF signal via the antenna;

and wherein, when a second signal is received via the antenna, the method further comprises:

separating the second signal received via the antenna from an RF signal to be transmitted;

processing the separated signal to generate an Intermediate Frequency (IF) signal;

demodulating the generated IF signal; and transmitting the demodulated IF signal via the optical fiber, the step of transmitting comprising:

dividing the demodulated IF signal into a third branch and a fourth branch;

taking the third branch of the demodulated IF signal as a backup signal;

selecting for process, a fourth transmission signal from the group consisting of: (a) the fourth branch of the demodulated IF signal, and (b) a fifth transmission signal sent from the traffic protection bus; and transmitting the fourth transmission signal, after being processed, via the optical fiber.

2. An apparatus for transmitting/receiving a signal in a microwave system, comprising an optical fiber signal interface, a signal reception module, a modulation module, an IF-RF transmission module, a duplexer, a control module and a power interface, wherein the signal reception module is adapted to receive a transmission signal sent from another apparatus via the optical fiber signal interface, and send a corresponding signal to the modulation module;

the modulation module is adapted to modulate the corresponding signal sent from the signal reception module;

the IF-RF transmission module is adapted to process the corresponding signal having been modulated by the modulation module to generate an RF signal;

the duplexer is adapted to separate the RF signal to be transmitted from a signal received via an antenna, and transmit the separated RF signal to the antenna;

the control module is adapted to configure and manage the signal reception module, the modulation module and the IF-RF transmission module in the apparatus; and the power interface is adapted to enable another apparatus to supply power to the apparatus, and wherein the signal reception module is adapted to receive the transmission signal via the optical fiber signal interface, divide the received signal into two branches, take one branch of the received signal as a backup signal, and select any one transmission signal from the other branch of the received signal and a transmission signal sent via a traffic protection bus interface connected to the apparatus for transmission to the modulation module.

3. The apparatus for transmitting/receiving a signal in a microwave system according to claim 2, wherein the duplexer is adapted to separate a signal received via the antenna from an RF signal to be transmitted, wherein the apparatus is further adapted to comprise an IF-RF reception module adapted to process the received signal separated by the duplexer to generate an IF signal and a demodulation module adapted to demodulate the generated IF signal;

wherein the signal reception module is further adapted to transmit the signal demodulated by the demodulation module to other apparatuses via the optical fiber signal interface, and wherein the control module is further adapted to configure and manage the IF-RF reception module and the demodulation module in the apparatus.

4. The apparatus for transmitting/receiving a signal in a microwave system according to claim 3, wherein the signal reception module is adapted to divide the demodulated received signal sent from the demodulation module into two branches, take one branch of the received signal as a backup signal, select any one from the other branch of the received signal and a demodulated received signal sent from the traffic protection bus interface to process, and transmit the received signal after being processed via the optical fiber signal interface.

5. A transceiving system for transmitting/receiving a signal in a microwave system, comprising a first and second transmitting/receiving apparatus and a traffic protection bus interface connecting the first and second transmitting/receiving apparatus to each other, wherein, each of the first and second transmitting/receiving apparatus is adapted to divide a transmission signal received from an external apparatus into two branches, send one branch of the received transmission signal to the other one of the first and second transmitting/receiving apparatus and receive a signal sent from the other one of the first and second transmitting/receiving apparatus via the traffic protection bus interface, and select any one of the other branch of the received signal and the signal sent from the other one of the first and second transmitting/receiving apparatus via the traffic protection bus interface to be processed and transmitted;

wherein each of the first and second transmitting/receiving apparatus comprises an optical fiber signal interface, a signal reception module, a modulation module, an IF-RF transmission module, a duplexer, and a control module, and wherein the signal reception module is adapted to receive the transmission signal from the external apparatus via the optical fiber signal interface, divide the received signal into two branches, send one branch of the received signal to the other one of the first and second transmitting/receiving apparatus and receive a signal sent from the other one of the first and second transmitting/receiving apparatus via the traffic protection bus interface, and select any one of the other branch of the received signal and the signal sent from the other one of the first and second transmitting/receiving apparatus via the traffic protection bus interface, and send the selected signal to the modulation module;

the modulation module is adapted to modulate the signal sent from the signal reception module;

the IF-RF transmission module is adapted to process the signal having been modulated by the modulation module to generate an RF signal;

the duplexer is adapted to separate the RF signal to be transmitted from a signal received via an antenna, and transmit the separated RF signal to the antenna; and the control module is adapted to configure and manage the signal reception module, the modulation module and the IF-RF transmission module in the apparatus.

* * * * *

UNITED STATES PATENT AND TRADEMARK OFFICE

CERTIFICATE OF CORRECTION

PATENT NO. : 8,385,745 B2
APPLICATION NO. : 12/625878
DATED : February 26, 2013
INVENTOR(S) : Guixue Zhao It is certified that error appears in the above-identified patent and that said Letters Patent is hereby corrected as shown below:

On the Title Page, item [75] Inventor, “Guangdong (CN)” should read -- Shenzhen (CN) --.

Signed and Sealed this
Seventeenth Day of December, 2013

Margaret A. Focarino
*Commissioner for Patents of the United States Patent and Trademark Office*